US011112002B2

(12) United States Patent
Kim

(10) Patent No.: US 11,112,002 B2
(45) Date of Patent: Sep. 7, 2021

(54) LUBRICATION DEVICE FOR AUTOMATIC TRANSMISSION

(71) Applicant: Hyundai Transys Inc., Hwaseong-si (KR)

(72) Inventor: Tae Hoon Kim, Hwaseong-si (KR)

(73) Assignee: HYUNDAI TRANSYS INC., Hwaseong-si (KR)

( * ) Notice: Subject to any disclaimer, the term of this patent is extended or adjusted under 35 U.S.C. 154(b) by 0 days.

(21) Appl. No.: 17/077,497

(22) Filed: Oct. 22, 2020

(65) Prior Publication Data

US 2021/0123519 A1 Apr. 29, 2021

(30) Foreign Application Priority Data

Oct. 25, 2019 (KR) ......................... 10-2019-0133822

(51) Int. Cl.
F16H 57/04 (2010.01)

(52) U.S. Cl.
CPC ..... *F16H 57/0484* (2013.01); *F16H 57/0427* (2013.01); *F16H 57/0471* (2013.01); *F16H 57/0479* (2013.01)

(58) Field of Classification Search
None
See application file for complete search history.

(56) References Cited

U.S. PATENT DOCUMENTS

| 2012/0028748 A1* | 2/2012 | Burgman | ............ | F16H 57/0484 |
|---|---|---|---|---|
| | | | | 475/159 |
| 2014/0287864 A1* | 9/2014 | Iizuka | ................. | F16H 57/0426 |
| | | | | 475/159 |

FOREIGN PATENT DOCUMENTS

| JP | H11-159614 A | 6/1999 |
|---|---|---|
| JP | 2016-003686 A | 1/2016 |
| KR | 10-0863485 B1 | 10/2008 |
| KR | 10-2010-0062632 A | 6/2010 |

OTHER PUBLICATIONS

Office Action dated Nov. 12, 2020 in Korean Application No. 10-2019-0133822.

* cited by examiner

*Primary Examiner* — Colby M Hansen

(74) *Attorney, Agent, or Firm* — Saliwanchik, Lloyd & Eisenschenk

(57) ABSTRACT

A lubrication device for an automatic transmission, the lubrication device includes: a pinion gear unit comprising a pinion shaft and a pinion gear surrounding the pinion shaft, a ring gear unit engaged with the pinion gear, a first thrust bearing coupled to the ring gear unit, a second thrust bearing disposed on one side of the pinion gear, an oil guide coupled to the pinion shaft and guiding the oil, scattering from the first thrust bearing, toward the pinion shaft, a sun gear engaged with the pinion gear and comprising a first oil hole portion through which the oil passes and a second oil hole portion allowing the oil to be supplied toward the second thrust bearing therethrough, and a carrier comprising a third oil hole portion receiving the oil from the first oil hole portion and transferring the received oil toward the first thrust bearing and a fourth oil hole portion receiving the oil from the second thrust bearing and transferring the received oil toward the oil guide.

6 Claims, 4 Drawing Sheets

LUBRICATION DEVICE FOR AUTOMATIC TRANSMISSION

CROSS-REFERENCE TO RELATED APPLICATION

This application claims priority from and the benefit of Korean Patent Application No. 10-2019-0133822, filed on Oct. 25, 2019, which is hereby incorporated by reference for all purposes as if set forth herein.

BACKGROUND

Field

Exemplary embodiments of the present disclosure relate to a lubrication device for an automatic transmission, and more particularly, to a lubrication device for an automatic transmission, the lubrication device properly supplying oil toward a pinion shaft.

Discussion of the Background

In general, in a torque converter, oil is supplied to each of a plurality of thrust bearings. In some cases, only a portion of the oil supplied to plurality of thrust bearings is transferred to a pinion gear, and the remaining portion of the oil leaks to the outside and is not transferred toward a pinion shaft. As a result, there is a problem in that the amount of the oil introduced toward the pinion shaft may be insufficient, and thus, the supply of oil may not be efficient. Therefore, an improvement is required to overcome this problem.

A background art of the present invention is disclosed in Korean Patent No. 10-0863485 (titled "POWER TRANSMITTING AND LUBRICATION DEVICE FOR AUTOMATIC TRANSMISSION," registered on Oct. 8, 2008).

SUMMARY

Various embodiments are directed to a lubrication device for an automatic transmission, the lubrication device properly supplying oil toward a pinion shaft.

In an embodiment, a lubrication device for an automatic transmission, the lubrication device including: a pinion gear unit including a pinion shaft and a pinion gear surrounding the pinion shaft; a ring gear unit engaged with the pinion gear; a first thrust bearing coupled to the ring gear unit; a second thrust bearing disposed on one side of the pinion gear; an oil guide coupled to the pinion shaft and guiding oil, scattering from the first thrust bearing, toward the pinion shaft; a sun gear engaged with the pinion gear and including a first oil hole portion through which the oil passes and a second oil hole portion allowing the oil to be supplied toward the second thrust bearing therethrough; and a carrier including a third oil hole portion receiving the oil from the first oil hole portion and transferring the received oil toward the first thrust bearing and a fourth oil hole portion receiving the oil from the second thrust bearing and transferring the received oil toward the oil guide.

The fourth oil hole portion may include a fourth oil inlet disposed to face the second thrust bearing and allowing the oil to be introduced therethrough.

The fourth oil hole portion may further include a fourth oil outlet disposed between the pinion shaft and the first thrust bearing and allowing the oil, introduced from the fourth oil inlet, to be discharged therethrough.

The fourth oil hole portion may further include a fourth oil path portion connecting the fourth oil inlet and the fourth oil outlet and disposed to be inclined with respect to the third oil hole portion.

The fourth oil hole portion may be disposed to be inclined such that the fourth oil hole portion is closer to the third oil hole portion in a direction from the fourth oil inlet toward the fourth oil outlet.

The pinion gear unit may further include a needle bearing disposed between the pinion shaft and the pinion gear, and the pinion shaft includes an oil passage hole portion allowing the oil, received through the oil guide, to be supplied toward the needle bearing.

The lubrication device for an automatic transmission according to the present disclosure includes the fourth oil hole portion receiving oil from the second thrust bearing and transferring the oil toward the oil guide. Accordingly, the amount of oil guided toward the pinion shaft through the oil guide may be increased, so that the oil may be properly supplied toward the pinion shaft.

DETAILED DESCRIPTION OF THE ILLUSTRATED EMBODIMENTS

Figure 1:
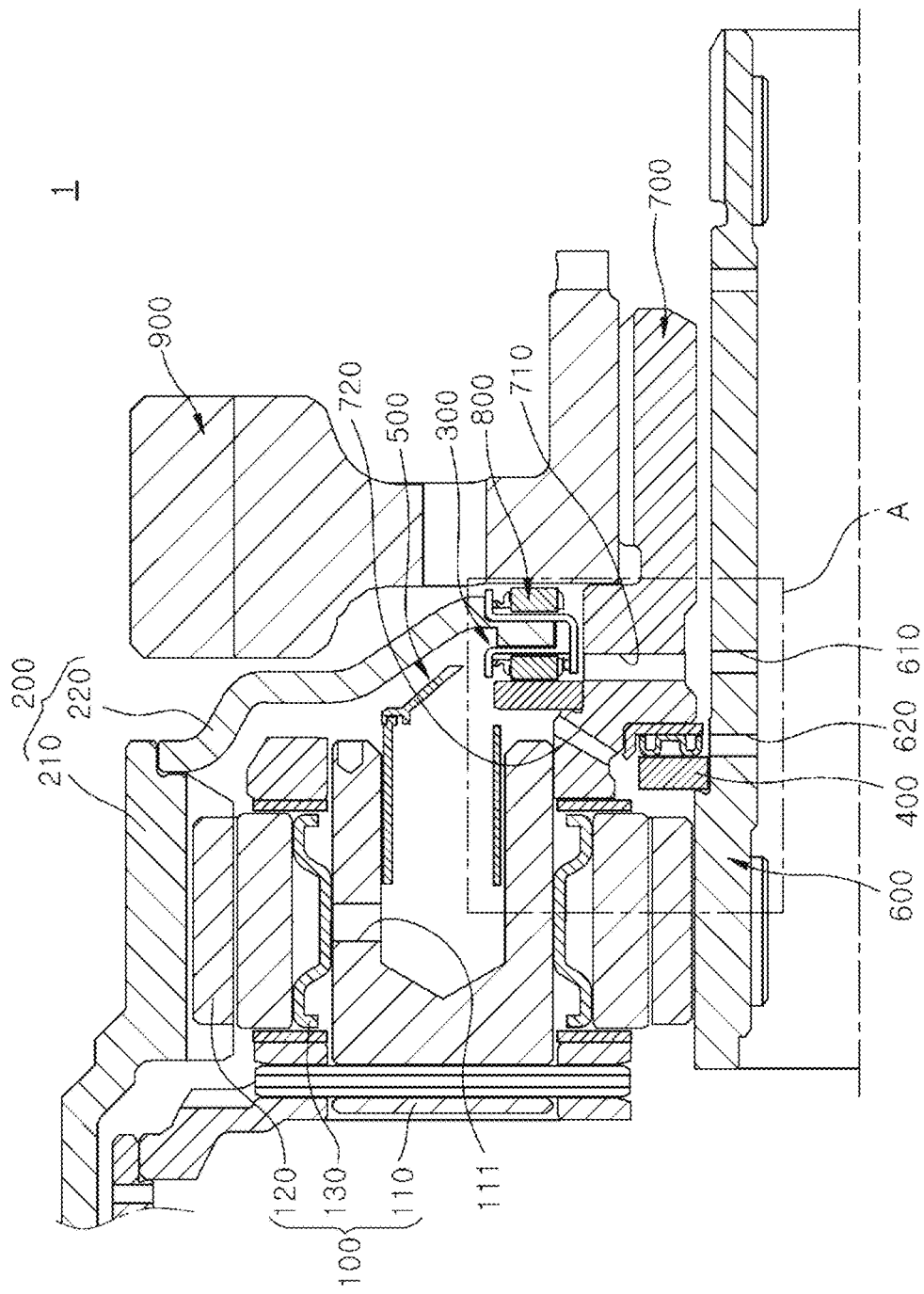
FIG. 1 is a cross-sectional view illustrating a lubrication device for an automatic transmission according to an embodiment of the present disclosure.

Hereinafter, a lubrication device for an automatic transmission will be described below with reference to the accompanying drawings through various exemplary embodiments of the present disclosure.

In the following description, the thicknesses of lines or the sizes of components illustrated in the drawings may be exaggerated for clarity and convenience of explanation. In addition, the terms used herein are defined in consideration of functions thereof in the present disclosure, but may vary depending on the intentions of users or operators, or practices. Therefore, the terms shall be defined on the basis of the description throughout the specification.

Figure 2:
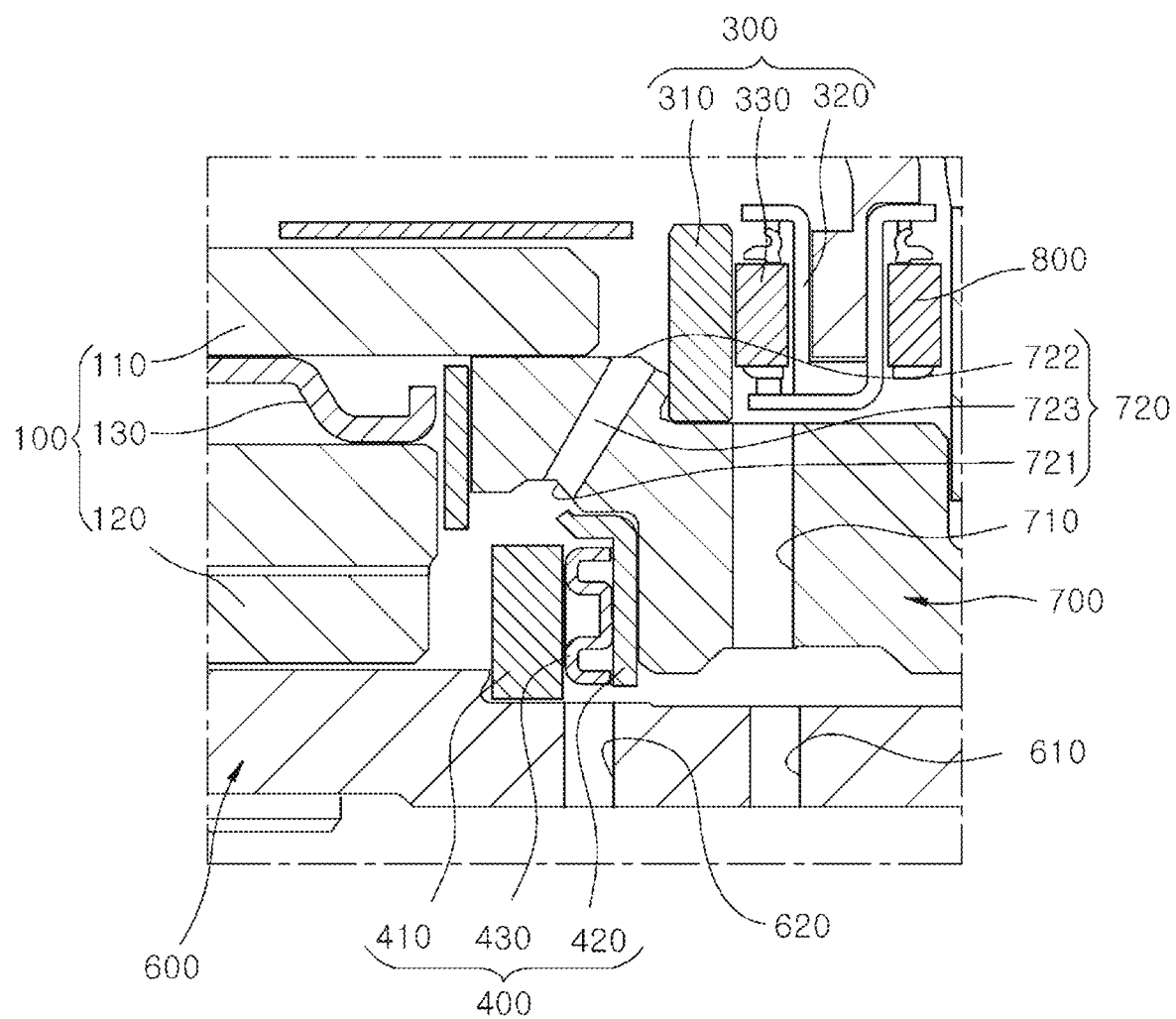
FIG. 2 is an enlarged view of the main portions of FIG. 1.
Figure 3:
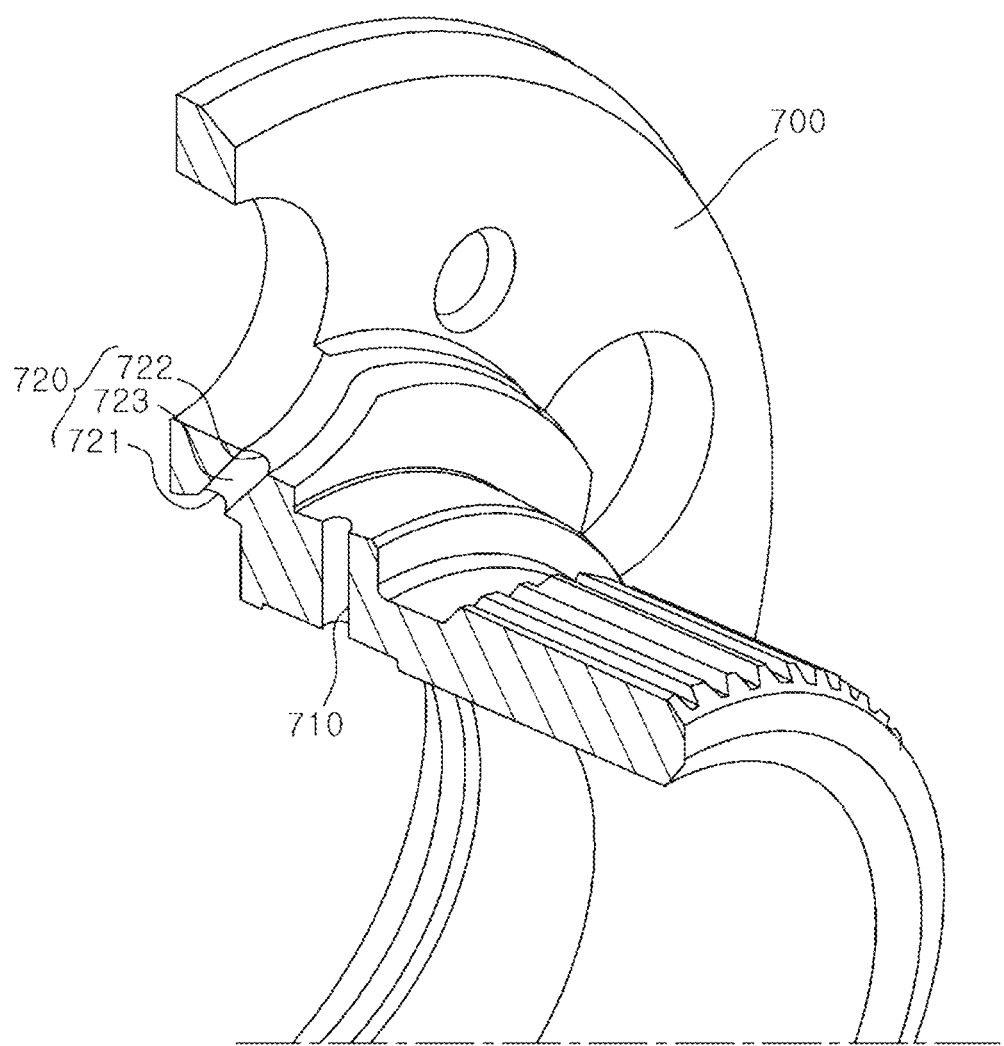
FIG. 3 is a half sectional perspective view of the main portion of the carrier in the lubrication device for an automatic transmission according to the embodiment of the present disclosure.
Figure 4:
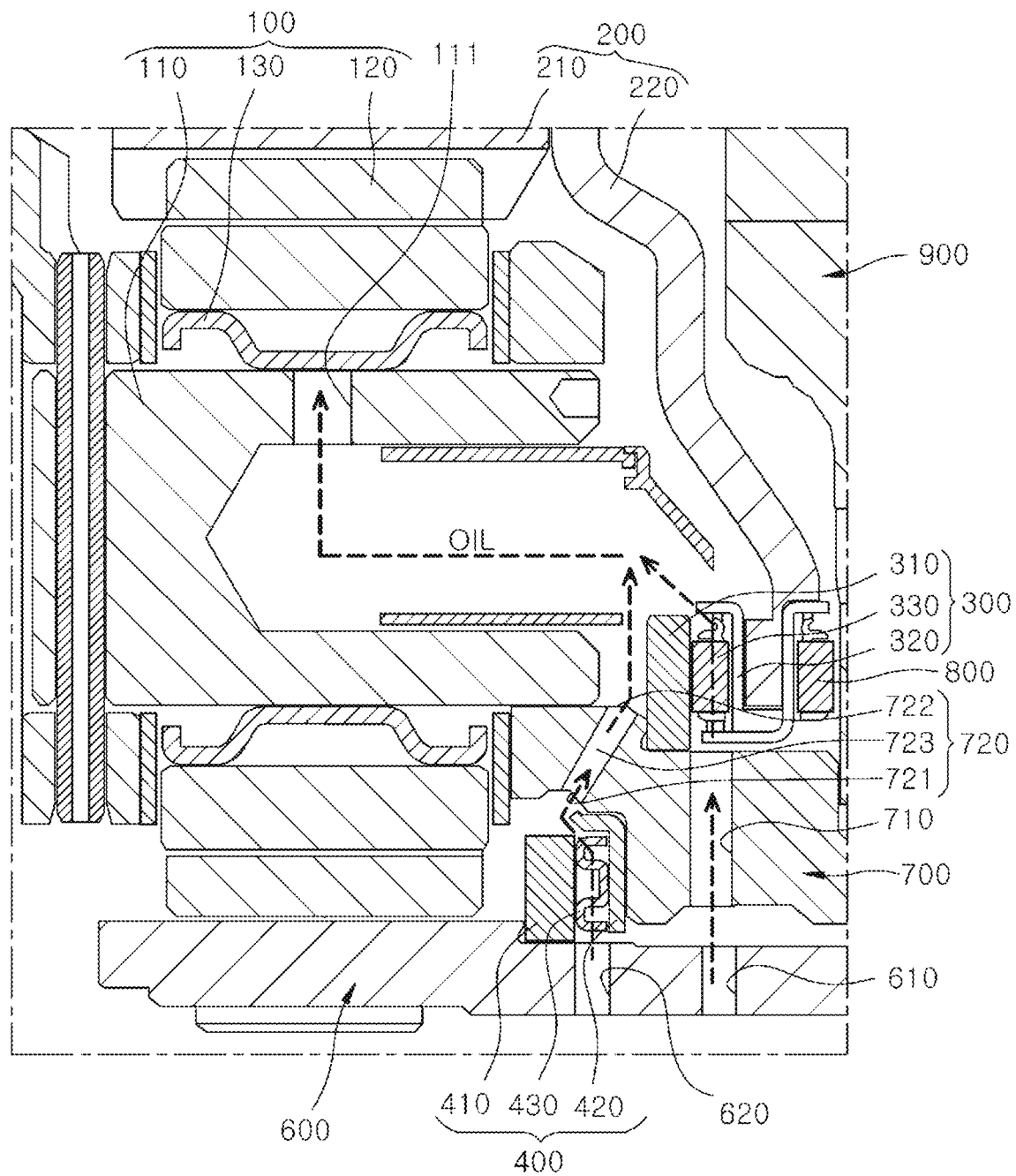
FIG. 4 is a view illustrating flows of oil in the lubrication device for an automatic transmission according to the embodiment of the present disclosure.

FIG. 1 is a cross-sectional view illustrating a lubrication device for an automatic transmission according to an embodiment of the present disclosure, FIG. 2 is an enlarged view of the main portions of FIG. 1, FIG. 3 is a half sectional perspective view of the main portion of the carrier in the lubrication device for an automatic transmission according to the embodiment of the present disclosure, and FIG. 4 is a view illustrating flows of oil in the lubrication device for an automatic transmission according to the embodiment of the present disclosure.

Referring to FIGS. 1 to 3, the lubrication device 1 for an automatic transmission according to the embodiment of the present disclosure includes a pinion gear unit 100, a ring gear unit 200, a first thrust bearing 300, a second thrust bearing 400, an oil guide 500, a sun gear 600, a carrier 700, a third thrust bearing 800, and a transfer gear 900.

The pinion gear unit 100 includes a pinion shaft 110, a pinion gear 120, and a needle bearing 130.

The pinion shaft 110 is coupled to the carrier 700. The pinion shaft 110 has an oil passage hole portion 111 through which oil passes. The oil passage hole portion 111 allows oil transferred through the oil guide 500 to be supplied toward the needle bearing 130.

As illustrated in FIG. 4, oil transferred to the pinion shaft 110 is moved to the left (based on FIG. 4) along the oil passage hole portion 111 and then transferred to the needle bearing 130 located above the oil passage hole portion 111 (based on FIG. 4).

The pinion gear 120 surrounds the pinion shaft 110. The pinion gear 120 surrounds the outer surface of the needle bearing 130 and receives oil from the needle bearing 130.

The needle bearing 130 is disposed between the pinion shaft 110 and the pinion gear 120. The needle bearing 130 surrounds the outer surface of the pinion shaft 110 and receives oil from the oil passage hole portion 111.

The ring gear unit 200 surrounds the pinion gear 120 and is engaged with the pinion gear 120. The ring gear unit 200 includes a ring gear 210 and a support flange 220. The ring gear 210 surrounds the pinion gear 120 and is engaged with the pinion gear 120. The support flange 220 is connected to the ring gear 210.

The first thrust bearing 300 is coupled to the ring gear unit 200. As illustrated in FIG. 1, the first thrust bearing 300 is coupled to the left portion of a distal end of the support flange 220 (based on FIG. 1). The third thrust bearing 800 is coupled to the right portion of the distal end of the support flange 220.

The second thrust bearing 400 is disposed on one side of the pinion gear 120. The second thrust bearing 400 is disposed to the right of the pinion gear 120 (based on FIG. 1). Here, the second thrust bearing 400 may be disposed between the sun gear 600 and the carrier 700 and be in contact with the sun gear 600 and the carrier 700.

The oil guide 500 is coupled to the pinion shaft 110, and guides, oil scattering from the first thrust bearing 300, toward the pinion shaft 110. That is, the oil guide 500 serves to trap the oil scattering from the first thrust bearing 300 to transfer the trapped oil to the pinion shaft 110.

The sun gear 600 is engaged with the pinion gear 120 and includes a first oil hole portion 610 and a second oil hole portion 620. The first oil hole portion 610 allows oil to pass therethrough. The second oil hole portion 620 is spaced apart from the first oil hole portion 610 and allows oil to be supplied toward the second thrust bearing 400 therethrough.

The carrier 700 is coupled to the pinion shaft 110 and includes a third oil hole portion 710 and a fourth oil hole portion 720. The third oil hole portion 710 receives oil from the first oil hole portion 610 and transfers the received oil the first thrust bearing 300.

The third oil hole portion 710 may be disposed to face a vibrator 330 disposed between an inner wheel 310 and an outer wheel 320 of the first thrust bearing 300. The fourth oil hole portion 720 receives oil from the second thrust bearing 400 and transfers the received oil toward the oil guide 500.

In the lubrication device 1 for an automatic transmission according to the present disclosure, the second thrust bearing 400 is disposed on an oil flow path connecting the second oil hole portion 620 and the fourth oil hole portion 720. Thus, oil supplied to the second thrust bearing 400 through the second oil hole portion 620 passes through the second thrust bearing 400 and then is transferred to a next structure through the fourth oil hole portion 720.

That is, the lubrication device 1 for an automatic transmission according to the present disclosure includes the fourth oil hole portion 720 configured to receive oil from the second thrust bearing 400 and transfer the received oil toward the oil guide 500. Thus, oil supplied to the second oil hole portion 620 passes through the fourth oil hole portion 720 and is guided toward the pinion shaft 110 by the oil guide 500 without leaking to the outside. Thus, according to the present disclosure, the amount of oil supplied to the pinion shaft 110 may be increased.

When oil scattering from the fourth oil hole portion 720 and the first thrust bearing 300 is transferred to the pinion shaft 110 through the oil guide 500, the oil is transferred to the needle bearing 130 through the oil passage hole portion 111 of the pinion shaft 110.

The needle bearing 130 receives oil from the pinion shaft 110 and transfers the received oil to the pinion gear 120 surrounding the outer portion of the needle bearing 130. The oil transferred to the pinion gear 120 is transferred to the ring gear 210.

The oil transferred to the pinion shaft 110 through the oil guide 500 may be sequentially transferred to the needle bearing 130, pinion gear 120, and the ring gear 210 (see FIG. 4).

The fourth oil hole portion 720 includes a fourth oil inlet 721, a fourth oil outlet 722, and a fourth oil path portion 723.

The fourth oil inlet 721 is disposed to face the second thrust bearing 400 and allows oil to be introduced from the second oil hole portion 620 therethrough.

Specifically, the fourth oil inlet 721 is disposed in the carrier 700 so as to face an inner wheel 410 of the second thrust bearing 400. The fourth oil inlet 721 may be disposed to the right of the inner wheel 410 of the second thrust bearing 400 (based on FIG. 4). A vibrator 430 is disposed between the inner wheel 410 and an outer wheel 420 of the second thrust bearing 400.

The fourth oil outlet 722 is disposed between the pinion shaft 110 and the first thrust bearing 300. The fourth oil outlet 722 allows oil introduced from the fourth oil inlet 721 to be discharged therethrough. The fourth oil outlet 722 is disposed in a portion of the carrier 700 to the right of the inner wheel 310 of the first thrust bearing 300 (based on FIG. 4).

The fourth oil path portion 723 connects the fourth oil inlet 721 and the fourth oil outlet 722 and is inclined from the fourth oil inlet 721 toward the fourth oil outlet 722.

The fourth oil outlet 722 is disposed to be closer to the third oil hole portion 710 than the fourth oil inlet 721 is. Thus, the fourth oil hole portion 720 is not disposed parallel to the third oil hole portion 710 but is gradually closer to the third oil hole portion 710 in a direction toward the fourth oil outlet 722.

According to this structure, compared to the fourth oil hole portion 720 disposed parallel to the third oil hole portion 710, the fourth oil hole portion 720 is disposed to be gradually closer to the third oil hole portion 710 in a direction toward the fourth oil outlet 722. Accordingly, the length of the lubrication device 1 for an automatic transmission may be reduced, thereby reducing the length of the transmission.

As set forth above, the lubrication device 1 for an automatic transmission according to the present disclosure may receive oil, which would otherwise leak to the outside through the pinion gear 120 after having passed through the second thrust bearing 400, from the second thrust bearing 400 through the fourth oil hole portion 720 and transfer the received oil toward the oil guide 500. Thus, the lubrication device 1 may transfer a sufficient amount of oil to the pinion shaft 110, compared to an oil hole portion of the related art, through which oil is supplied toward the first thrust bearing 300 and the oil guide 500, thereby improving the lubrication performance thereof.

Furthermore, the length of the fourth oil hole portion 720 according to the present disclosure may be reduced compared to that of the oil hole portion of the related art, thereby reducing the length of the transmission.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. A lubrication device for an automatic transmission, the lubrication device comprising:
    a pinion gear unit comprising a pinion shaft and a pinion gear surrounding the pinion shaft;
    a ring gear unit engaged with the pinion gear;
    a first thrust bearing coupled to the ring gear unit;
    a second thrust bearing disposed on one side of the pinion gear;
    an oil guide coupled to the pinion shaft and that guides the oil, configured to scatter from the first thrust bearing, toward the pinion shaft;
    a sun gear engaged with the pinion gear and comprising a first oil hole portion through which the oil passes and a second oil hole portion configured to allow the oil to be supplied toward the second thrust bearing therethrough; and
    a carrier comprising a third oil hole portion that receives the oil from the first oil hole portion and transfers the received oil toward the first thrust bearing, and a fourth oil hole portion that receives the oil from the second thrust bearing and transfers the received oil toward the oil guide.

2. The lubrication device according to claim 1, wherein the fourth oil hole portion comprises a fourth oil inlet disposed to face the second thrust bearing and that allows the oil to be introduced therethrough.

3. The lubrication device according to claim 2, wherein the fourth oil hole portion further comprises a fourth oil outlet disposed between the pinion shaft and the first thrust bearing and that allows the oil, introduced from the fourth oil inlet, to be discharged therethrough.

4. The lubrication device according to claim 3, wherein the fourth oil hole portion further comprises a fourth oil path portion connecting the fourth oil inlet and the fourth oil outlet and disposed to be inclined with respect to the third oil hole portion.

5. The lubrication device according to claim 4, wherein the fourth oil hole portion is disposed to be inclined such that the fourth oil hole portion is closer to the third oil hole portion in a direction from the fourth oil inlet toward the fourth oil outlet.

6. The lubrication device according to claim 1, wherein the pinion gear unit further comprises a needle bearing disposed between the pinion shaft and the pinion gear, and wherein the pinion shaft comprises an oil passage hole portion that allows the oil, received through the oil guide, to be supplied toward the needle bearing.

* * * * *